United States Patent
Zayeratabat

[11] Patent Number: 5,996,279
[45] Date of Patent: Dec. 7, 1999

[54] PLANT IRRIGATION APPARATUS

[76] Inventor: Esmail Zayeratabat, 2495 Kingfield Way, San Jose, Calif. 95124

[21] Appl. No.: 09/099,747

[22] Filed: Jun. 18, 1998

[51] Int. Cl.[6] .................................................... A01G 27/02
[52] U.S. Cl. ............................................................ 47/48.5
[58] Field of Search .............................. 47/1.01 R, 48.5, 47/79, 80; 43/131

[56] References Cited

U.S. PATENT DOCUMENTS

| | | |
|---|---|---|
| 3,755,966 | 9/1973 | Smith . |
| 3,821,863 | 7/1974 | Chan . |
| 3,876,146 | 4/1975 | Pacheco . |
| 3,916,564 | 11/1975 | Crowell, Sr. ............................ 47/48.5 |
| 4,361,983 | 12/1982 | Wilson ................................... 47/48.5 |
| 4,454,684 | 6/1984 | O'Hare . |
| 4,726,143 | 2/1988 | Steinbeck . |
| 5,212,905 | 5/1993 | Philoctete . |
| 5,443,544 | 8/1995 | Azoulay ................................. 47/48.5 |
| 5,558,030 | 9/1996 | Ward ................................. 47/48.5 X |
| 5,761,846 | 6/1998 | Marz ...................................... 47/48.5 |
| 5,809,692 | 9/1998 | Kesler ................................... 47/48.5 |

*Primary Examiner*—Michael J. Carone
*Assistant Examiner*—Jeffery L. Gellner
*Attorney, Agent, or Firm*—Coudert Brothers

[57] ABSTRACT

An apparatus for irrigating plants such as shrubs, flowers, and trees is disclosed. Water can be provided to the apparatus through an externally connected hose. The apparatus may be employed as part of an overall landscape irrigation system. The apparatus prevents leaves, bugs, and debris from entering an interior chamber of the apparatus, while allowing air into the interior chamber. Apertures are provided along the length of a downward projecting cylindrical stem. Water flows from within the stem, through the apertures, and into soil surrounding the stem. Soil and stones are prevented from entering the stem interior. Further, a food basket or an in-line metering system may be integrated into the apparatus to provide for the controlled feeding of plants.

20 Claims, 9 Drawing Sheets

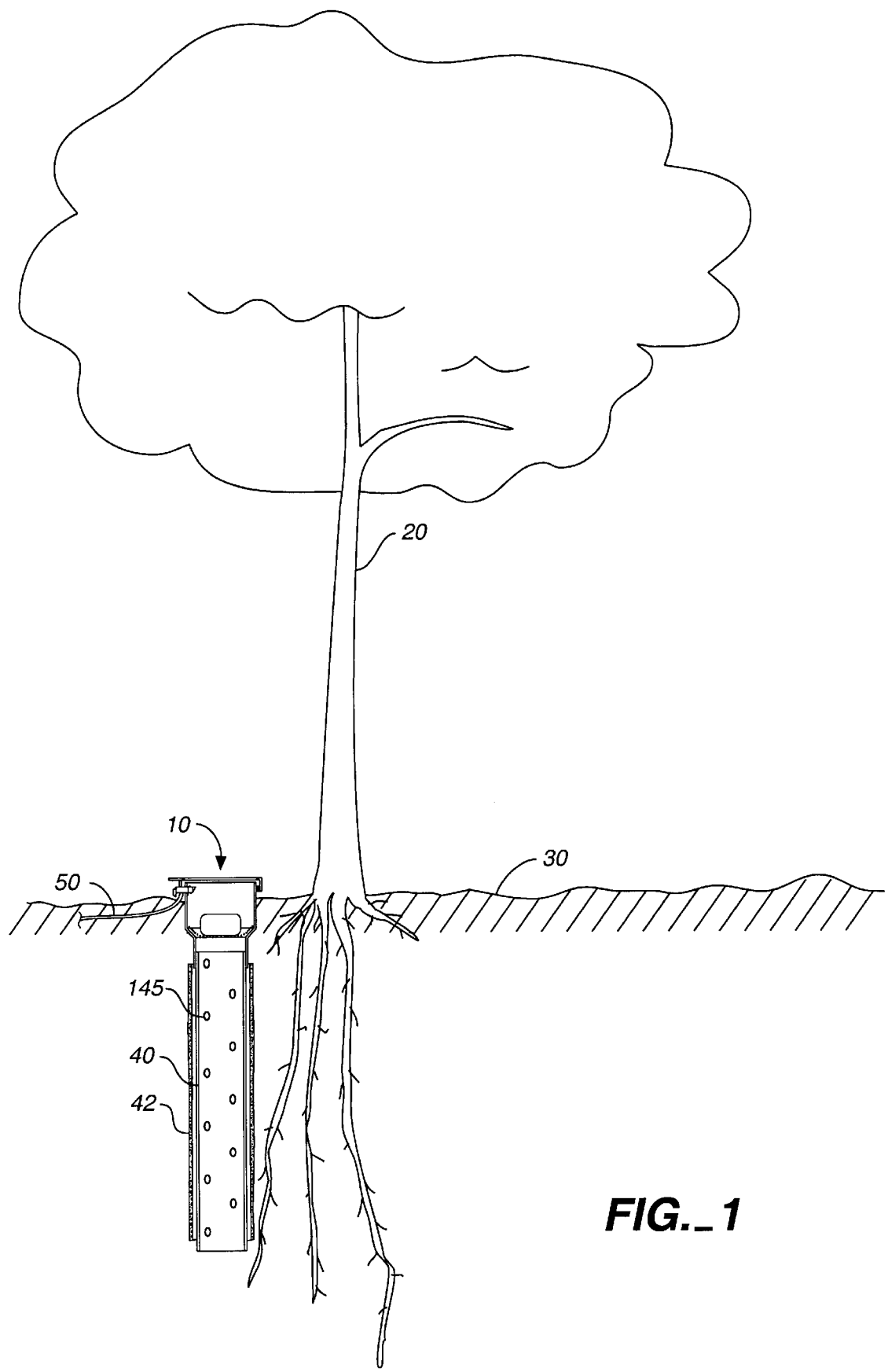
FIG._1

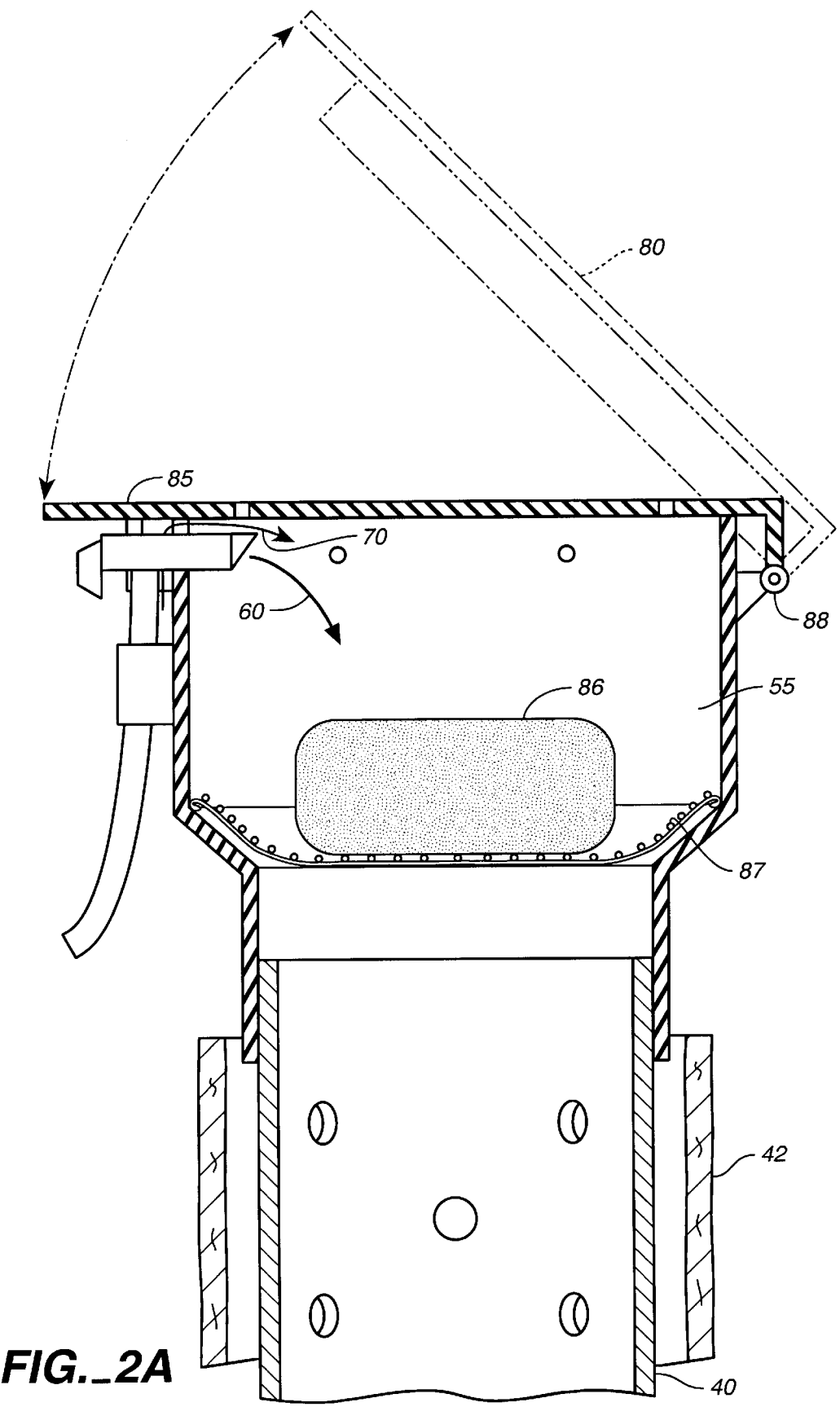
FIG._2A

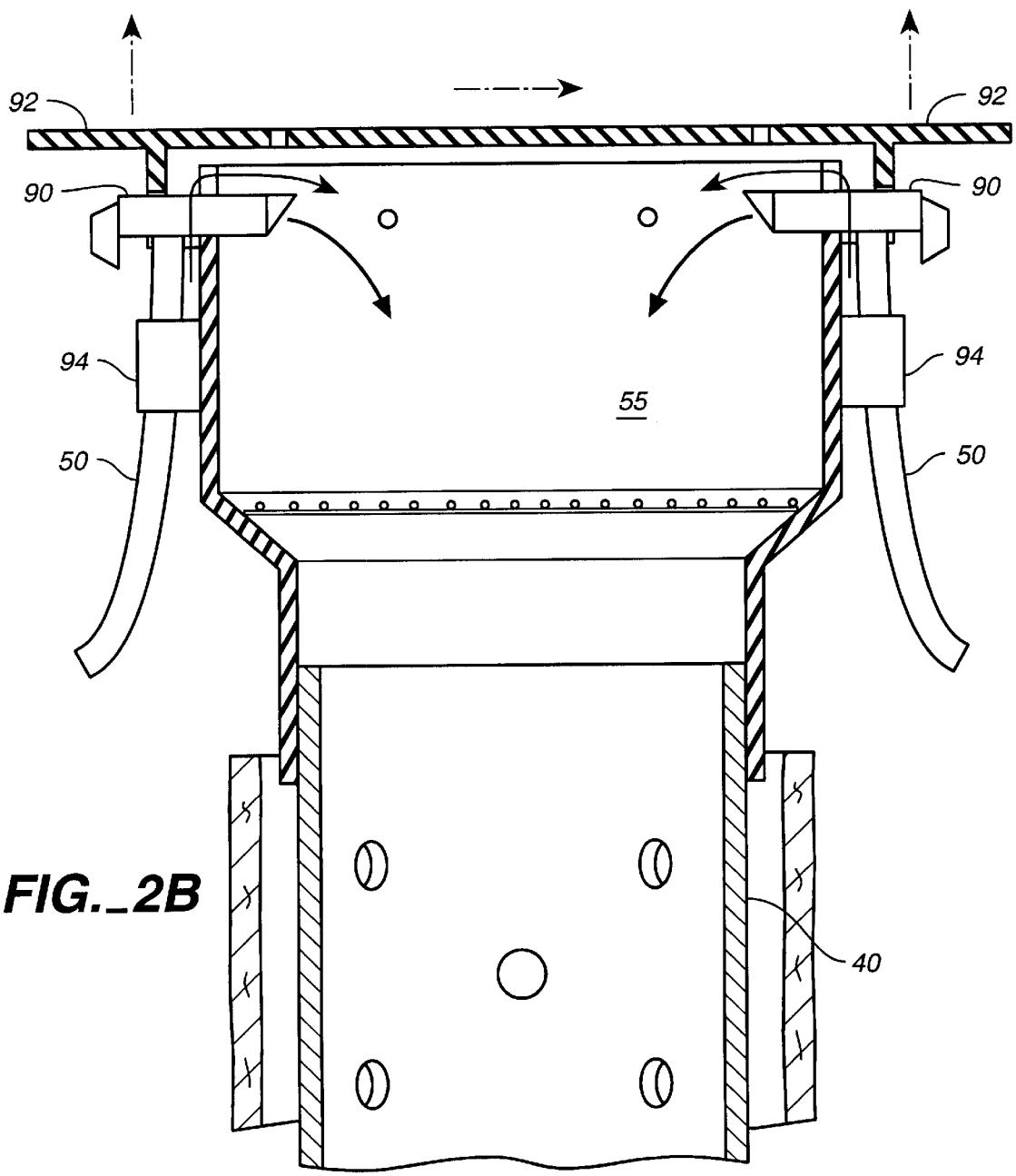
FIG._2B

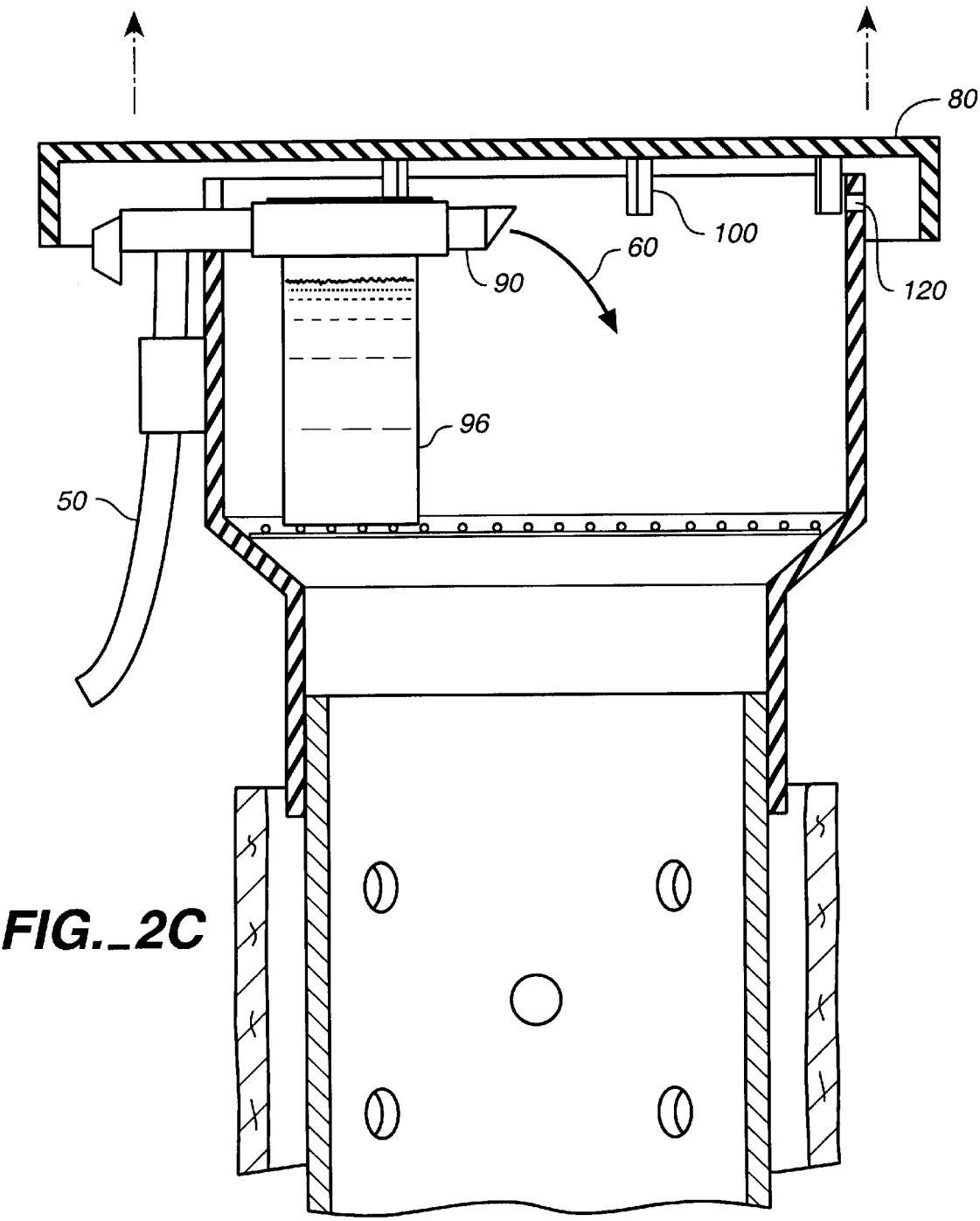
FIG._2C

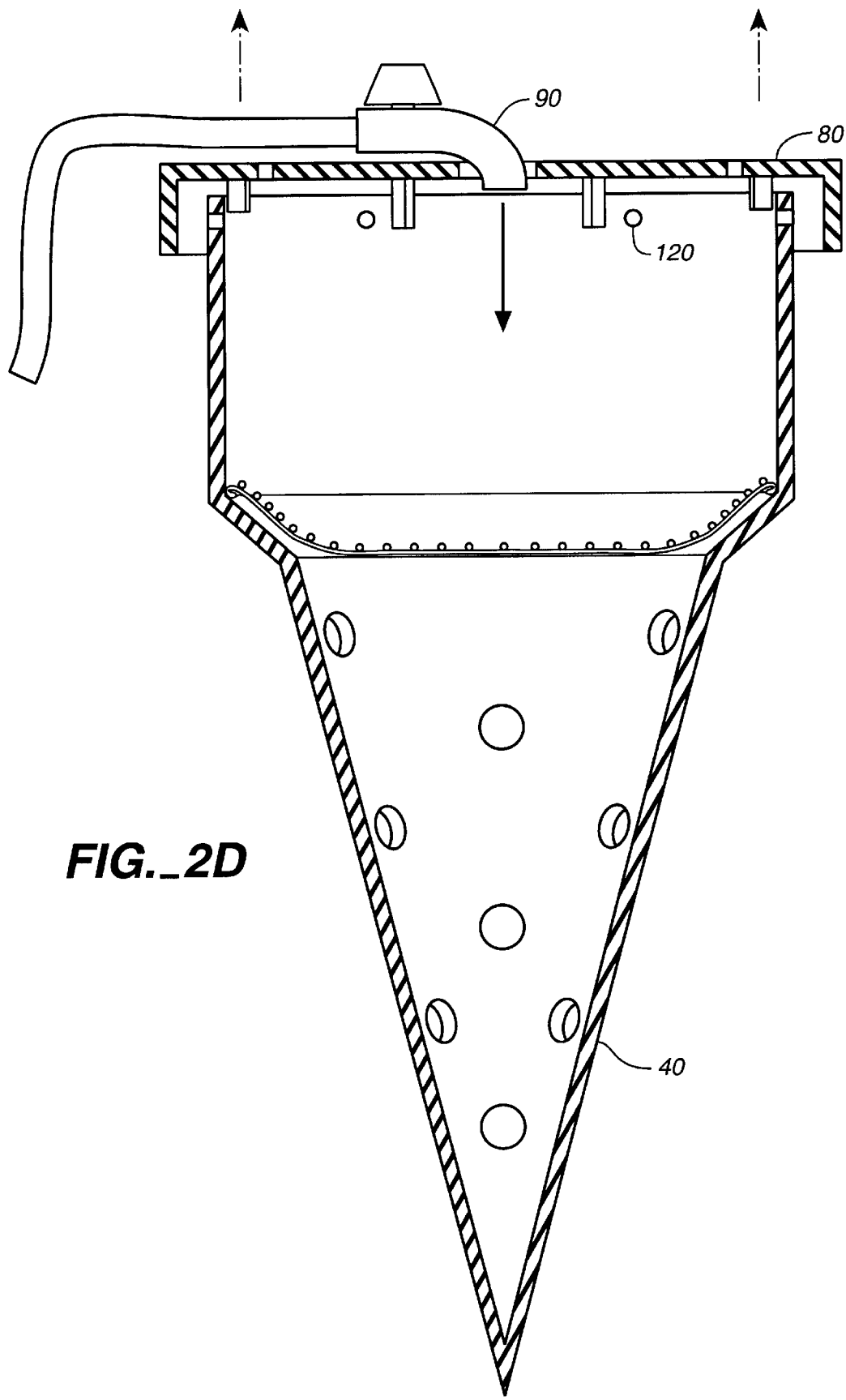
FIG._2D

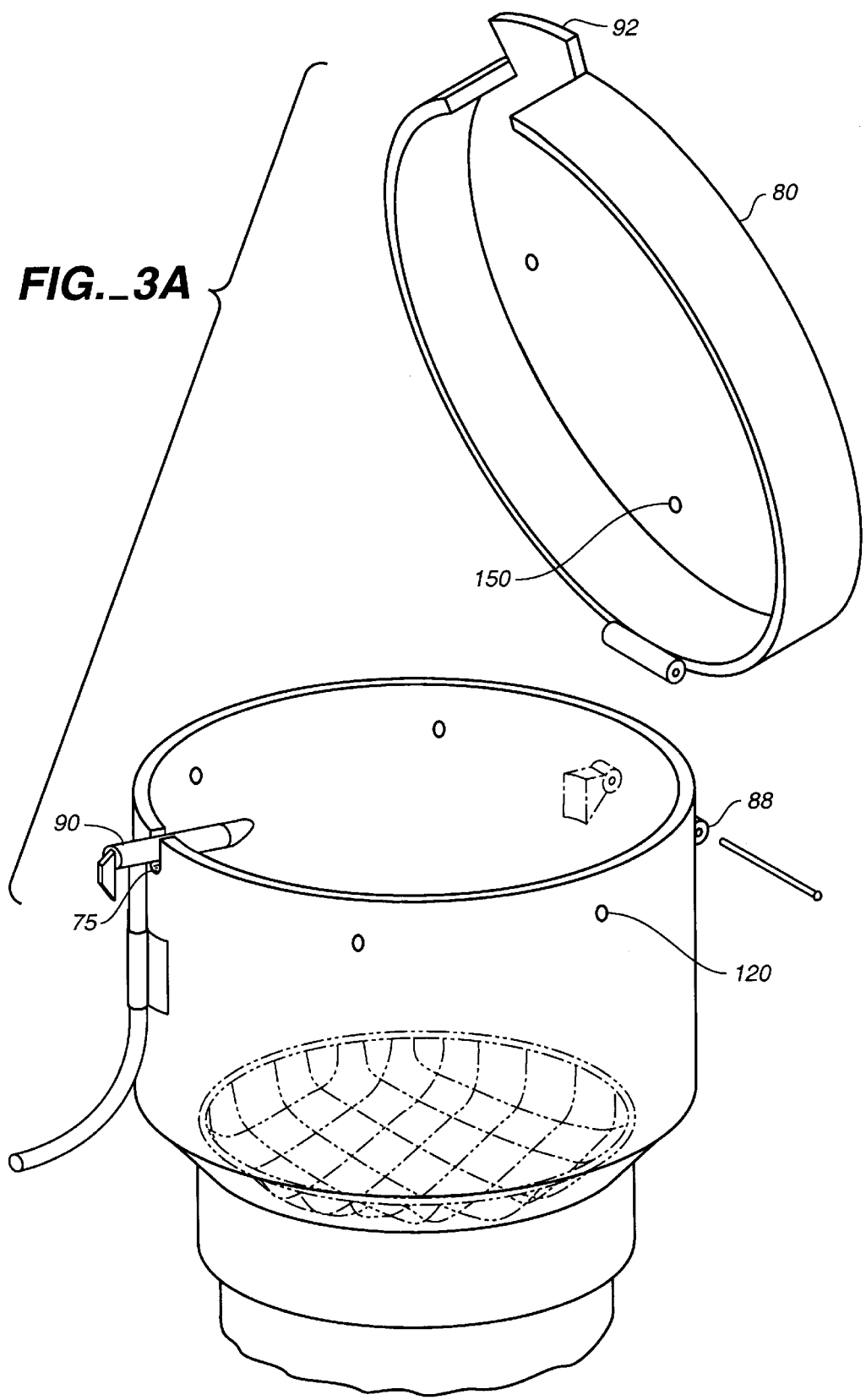
FIG._3A

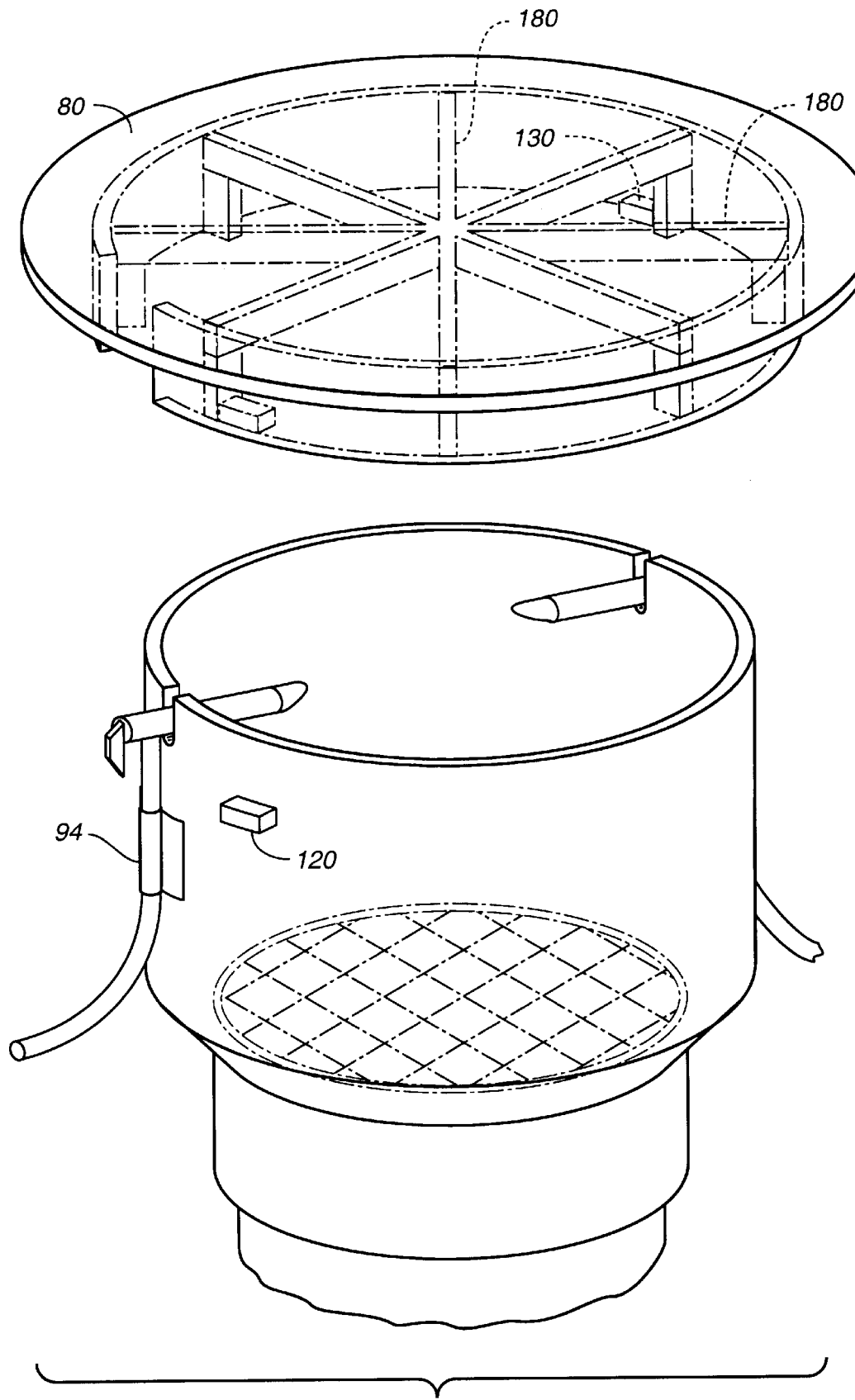
FIG._3B

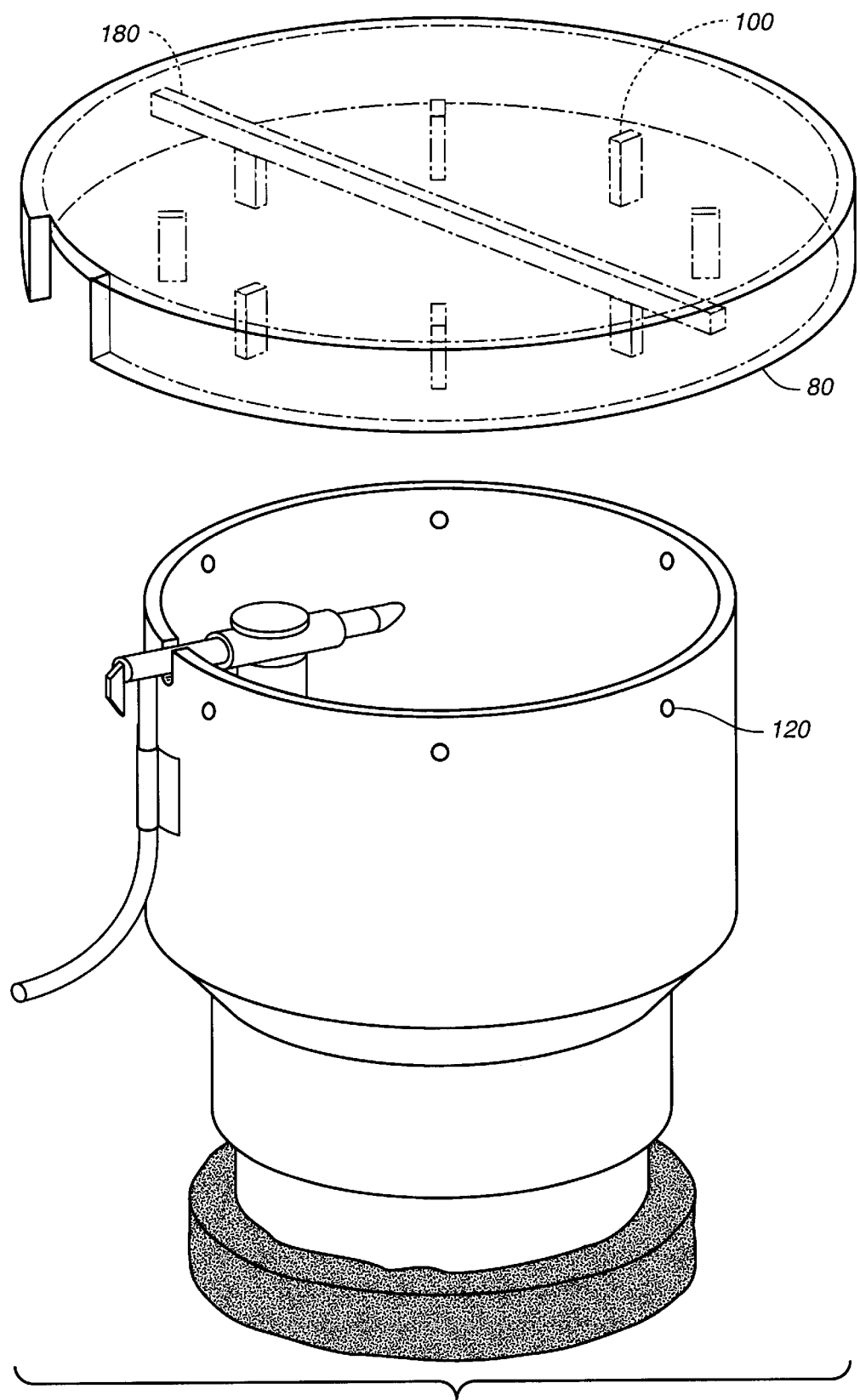
FIG._3C

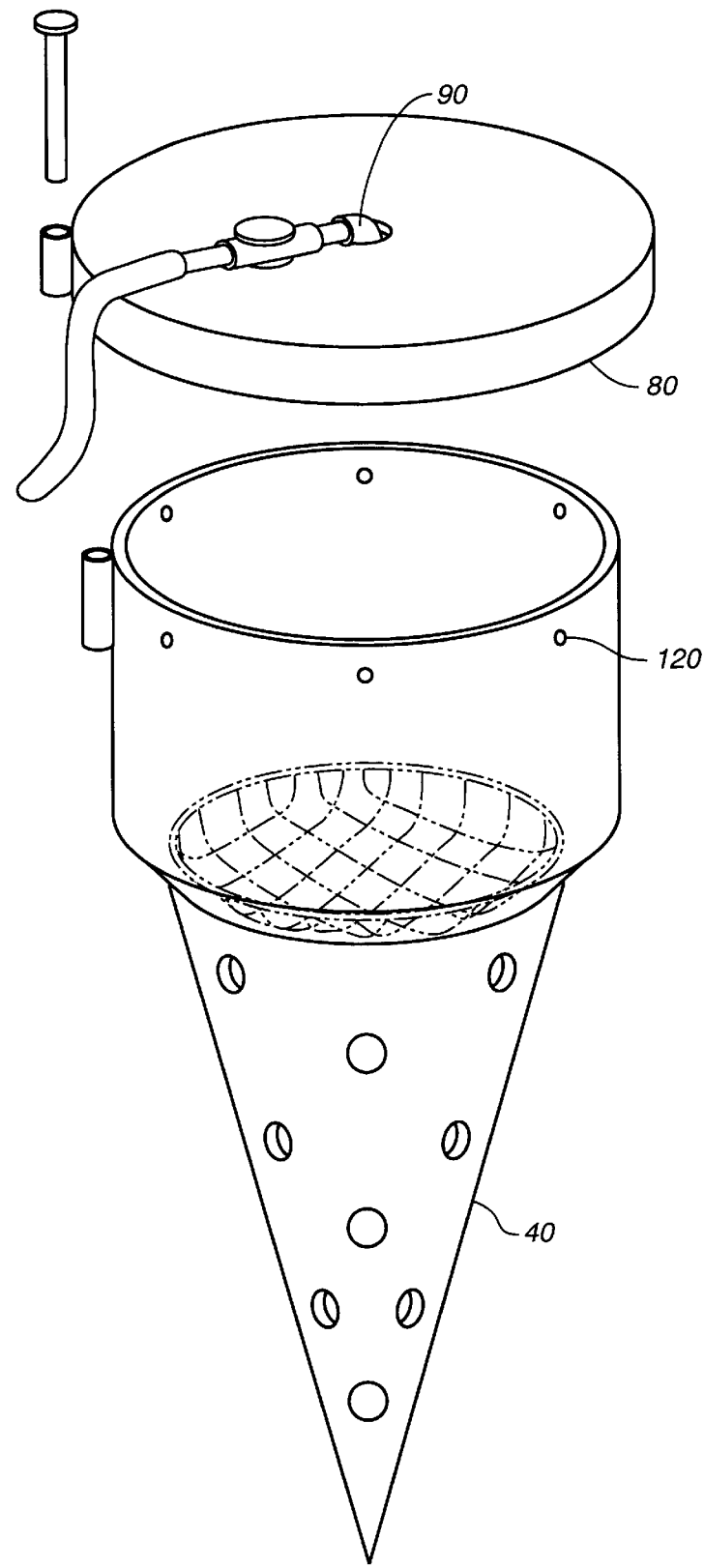
FIG._3D

PLANT IRRIGATION APPARATUS

FIELD OF THE INVENTION

The present invention relates to an apparatus for irrigating and feeding plants from small shrubs or flowers, to large trees.

BACKGROUND OF THE INVENTION

At present, a variety of irrigation apparatus are available for use in the watering of ornamental or farmed plants. Many of these apparatus are simply variations of traditional sprinklers, which have differing mechanisms for establishing spray patterns and flow rates which are appropriate to the type of plant for which the sprinkler is employed.

For certain shrubs, flowers (such as roses, etc.) and trees, it is important to be able to control both the amount of water which is supplied, but also in some cases, the supply of plant food or fertilizer and other chemical agents which are necessary for the sustained health and beauty of the plant.

The reader's attention is directed to several U.S. patents which disclose a more sophisticated apparatus for distributing water to plants. For example, U.S. Pat. No. 3,754,352, issued Aug. 28, 1973, to Bates discloses an above-ground, sealed water receptacle which distributes water to the soil underneath and allows the receptacle to be replenished when the water level dips below a certain elevation. In this case, the water receptacle is above ground, where it is susceptible to damage, or may impede the other landscaping activities which may be required near (in this instance) the tree which is being irrigated. In Bates, an air pipe is provided in the receptacle to allow the equalization of pressure so that water may flow.

In September of 1973, U.S. Pat. No. 3,755,966 was issued to Smith, disclosing a Deep Root Feeder and Tree Irrigator. The Smith apparatus teaches an elongated cannister which has a plurality of apertures at both ends and is filled with gravel and fertilizer pellets for the controlled feeding of the tree. The Smith apparatus relies on rainwater for its source of moisture, and by virtue of the construction at the top, is susceptible to clogging by debris such as leaves or other natural matter which may rest upon the device by the normal forces of nature. While similar to Bates in that moisture is introduced sub-surface, further improvements were made in the art with the issuance of U.S. Pat. No. 4,726,143, issued to Steinbeck on Feb. 23, 1988. Steinbeck was the first of these references to disclose a filter for the top of the canister for keeping out foreign debris, and a cylinder with more than one space or compartment for preventing the waste of fertilizer by exiting the top of the device in the event of, for example, flooding. Again, relying on rainwater rather than a certain source of moisture, the Steinbeck apparatus was the first reference found which began to address the practical problem of clogging of the upper end by debris, which is inherent in such devices.

The first reference found which disclosed an apparatus which also functioned to facilitate the introduction of oxygen into the plant root area was U.S. Pat. No. 3,821,863, issued Jul. 2, 1974 to Chan, and which provided compartments void of anything which would obstruct the ventilation of the lower section of the tapered container portion.

On May 25, 1993, U.S. Pat. No. 5,212,905 was issued to Philoctete for a Plant Watering Device disclosing a self-contained reservoir placed around a seedling plant, and which distributes water in two ways. When the water reservoir is full, a plurality of apertures at the upper end of the device releases water. Once the water level falls below the apertures, a drip nozzle continues to allow water to be distributed to the plant. In the Philoctete apparatus, after a plant reaches a certain size, the apparatus is no longer useful, making the device applicable only to seedling plants. Application for larger plants requires a different scheme in order to justify the expense of dedication of irrigation parts to a certain plant.

Consequently, the prior art which pertains to irrigating shrubs and trees has centered around food, oxygen and deep watering, but only in a piecemeal fashion. It is clear that the introduction of water, food, and oxygen at the proper depth is key, but the prior art has not met the whole of these needs to any great extent. Further, where nutrients are introduced, as in Smith or Steinbeck, significant time and labor is required to "re-charge" the device with fertilizer, taking away from the potential ease of automatic watering and feeding.

What is needed is an irrigation apparatus that efficiently distributes measured amounts of nutrients and water at the proper depth, is unobtrusive to the surface to resist damage, prevents clogging while allowing the free exchange of air and moisture, and which is easily maintained for rapid "re-charging" with plant food.

SUMMARY OF THE INVENTION

Broadly stated, the present invention is a novel approach to providing measured amounts of water, nutrients and oxygen along a deep rooted plant's root system, in an efficient, labor saving and unobtrusive way. Applicant's preferred embodiment employs a pointed and substantially cylindrical distribution stem which allows easy introduction of the apparatus into the ground. Atop the stem is a mixing chamber where water enters and mixes with plant food such that the combined mixture, by the force of gravity, fills the stem where apertures allow it to dissipate to the surrounding soil. A screen is provided on the outside of the stem to keep foreign objects from entering and clogging the stem, yet allowing the unobstructed flow of water out of the stem.

A basket, platform or screen is provided in the chamber to allow a measure of solid or granular fertilizer to be placed for dilution by water introduced through the chamber via an integral nozzle or, alternately, a nozzle directly coupled to the water supply line. A secondary or alternate receptacle for retaining liquid nutrients may also be employed inside the chamber in fluid communication with the water supply line. The water may be introduced by opposing nozzles, a single nozzle or even an annular ring, of drop or spray variety. The nozzles may be integral to the chamber or attached to the water supply line. Conventional irrigation drip lines and nozzles are suitable for application in the instant invention. In the case where an external, conventional watering hose is used as the water supply line, an adapter for use in conjunction with a nozzle integral to the mixing chamber may be employed.

A typically lipped cap is provided at the top of the mixing chamber, and is supported on the chamber by an offset, allowing air to enter underneath the lip, past the offset and into the chamber. In another embodiment, holes provided near the top of the chamber, and under the lip of the cap allow additional or optional means for uninterrupted air flow. Because the air path is provided thus, foreign debris such as leaves or cut grass are less likely to obstruct air flow. The cap may be easily rotated and lifted from the chamber, much like the cap to a childproof medicine bottle, in order to be removed. Another embodiment utilizes a hinge to secure the lid to the body of the device, allowing easy access to the mixing chamber. Differing embodiments of the device employ holes in the cap as well as the mixing body. These holes serve as alternate paths of air into the mixing chamber as dirt around the device may give rise to a need for additional ventilation via the cap, and also to allow extra water out of the device (particularly holes in the mixing chamber portion of the device).

In the preferred embodiment of the present invention, the water lines and nozzles are provided at the top of the mixing chamber, and the lipped cap is determinably shallow to allow the apparatus to be inserted into the soil, nearly flush with its surface. In an embodiment where the nozzle is positioned inside the chamber, it is protected from damage, unlike a nozzle positioned at the outside of the chamber. Such a design accomplishes several things. First, the apparatus does not present an impediment to traffic, lawn care devices such as weed trimmers and mowers, or animals, reducing the amount of potential damage from such forces. Further, the device is more aesthetically pleasing to the landscape design.

Applicant's invention may be fashioned from typical molded polyvinylchloride, as are many irrigation supplies. A variety of automatic timers may be employed to provide water to the device year-round, with the flow nozzle and time matched to provide the appropriate amount of water for mixing with whatever the plant food of choice happens to be. The device may be "re-charged" by simply removing the cap, and placing measure of solid, liquid or granular fertilizer into the basket or receptacle, and the provision of an air path in the instant case avoids the expense or labor associated with changing clogged or damaged filters. The device becomes therefore, relatively dirt free and bug free, allowing plant roots to project deeper into the ground.

The instant invention may also be scaled up or down, depending on the application; i.e., what size plant must be irrigated. For small shrubs for example, a one-piece design may be fashioned with a nozzle integral to the cap. For larger applications such as big trees, the more modular embodiment of the device disclosed in the drawings is properly applied.

If desired, a clear cap may be employed, allowing the person responsible for overall plant care to determine, without removing the cap, when the apparatus needs to be "recharged."

BRIEF DESCRIPTION OF THE DRAWINGS

FIG. 1 is a cross-sectional depiction of the present invention proximate to a plant for which it is used, showing the overall spacial relationship between the apparatus and the plant, including a relative depth to which it projects;

FIG. 2A is a cross-sectional view of the mixing chamber with hinged cap of the invention in FIG. 1 showing the path that air takes under the lipped cap, and the location of the water nozzle, proximate to said cap;

FIG. 2B is a cross-sectional view of an embodiment of the invention wherein opposing nozzles are applied with a non-hinged cap;

FIG. 2C is a cross-sectional view of an embodiment of the invention wherein an in line dispenser of liquid plant food is provided, and a cap employing offsets to establish ventilation is employed;

FIG. 2D is a cross-sectional view of a small-scale embodiment of the invention wherein the nozzle is integral to the cap;

FIG. 3A is an exploded isometric view of a preferred embodiment of the invention showing a hinged, clear cap with offsets, a tab on the cap to protect the nozzle when the cap is down, and a nozzle projecting into the mixing chamber with outside adjustment;

FIG. 3B is an exploded isometric view of a preferred embodiment of the invention showing a clear cap with offsets, a lip on the cap to protect two opposing nozzles when the cap is down, and a cap which is retained on the device body via locking tabs; and FIG. 3C is an exploded view of the device depicted in FIG. 2C.

FIG. 3D is an exploded view of the device shown in FIG. 2D.

DETAILED DESCRIPTION OF THE INVENTION

In a preferred embodiment as seen in FIG. 1, the apparatus 10, is located near a plant 20, and inserted into the ground 30, at or near its surface. A stem 40 protrudes into the ground shielded by a fabric stem screen 42 to provide deep watering to the plant's roots, and a water supply line 50, supplies liquid to the device. The stem screen 42 prevents the entry of foreign debris into stem 40. As shown in FIG. 1, the stem 40 includes a number of apertures or holes 145 along the length of the stem 40.

FIG. 2A shows the mixing chamber area 55, where water is directed along a path 60 therein. Air along a direction 70 is allowed into chamber 55 from under the cap 80, which has a lip 85. In this figure, a volume of plant food or fertilizer 86 rests on a basket, platform, or mixing chamber screen 87. Hinge 88 allows cap 80 to open for "recharging" the device, or to be closed during normal operation.

FIG. 2B shows a pair of adjustable nozzles 90, in line with water supplies 50, located proximate to the top of a substantially cylindrical mixing chamber 55. It must be noted that it is not necessary that the mixing chamber or stem 40, for that matter, be cylindrical in shape, except that it may be easier for insertion into the ground to employ a cylindrical design, and as well, the device may be fabricated using existing polyvinylchloride ("PVC") pipe in this configuration.

Also shown in FIG. 2B are tabs 92 (which may also be in the form of an all around cap lip) which protect the nozzles 90. Nozzle retainers 94 may be employed on the outside of the mixing chamber 55.

FIG. 2C shows an embodiment of the present invention which employs liquid dispenser 96 in line with water supply 50 and nozzle 90, directing a mixture of water and food along path 60. A plurality of locking tabs 100 are shown in position at the end of offsets (not shown). In this embodiment, cap 80 is lifted off the mixing chamber when access is desired. Several holes 120 are provided in the mixing chamber body to provide ventilation protected from soil at nearby ground level.

FIGS. 2D and 3D show a cap 80 which has an integral nozzle 90, which is generally a feature found on small-scale devices used for plants like small shrubs, or rose bushes. The portion of the body forming the mixing chamber has a plurality of holes 120 at the top. A stem 40 with apertures is shown in FIG. 2D.

FIG. 3A provides a good view of tab 92 which protects nozzle 90 when the cap is down. Offsets (not shown) keep the cap 80, which can be clear, off of the mixing chamber body allowing ventilation. The cap 80 includes apertures 150, and a hinge 88. The hinge 88 secures the cap 80 to the body. The nozzle 90 is disposed in a slot 75 near or proximate the top of the mixing chamber. Further, plural apertures 120 are also disposed near or proximate the top of the mixing chamber.

FIG. 3B shows locking tabs 120, which engage a lateral tab 130 provided on cap 80, to retain the cap on the mixing chamber body. In this embodiment, cap 80 has an all-around lip to protect the nozzles, and retainers 94 are shown attached to the mixing chamber body. Offsets 180 keep the cap 80 off of the mixing chamber allowing ventilation.

While the invention has been described in connection with what is presently considered the most practical and preferred embodiment(s), it is to be understood that the invention is not limited to the disclosed embodiment(s) but, on the contrary is intended to cover various modifications and equivalent arrangements included within the scope of the appended claims.

What is claimed is:

1. A plant irrigation apparatus comprising:
   a body having a mixing chamber portion at one end and a stem at another end, wherein the mixing chamber portion has a plurality of holes at a top portion of the mixing chamber portion, and wherein said stem has apertures along a length of the stem;
   a removable cap atop said mixing chamber portion, wherein said removable cap includes a lipped perimeter extending beyond said mixing chamber portion, and a plurality of holes proximate to said lipped perimeter being in communication with the plurality of holes at the top portion of the mixing chamber portion;
   a basket or a mixing chamber screen within said mixing chamber portion; and
   a water supply line coupled to the mixing chamber portion and adapted to supply water within said mixing chamber portion.

2. The plant irrigation apparatus of claim 1 further comprising:
   a stem screen substantially covering said stem.

3. The plant irrigation apparatus of claim 1 wherein said stem comprises a pointed end.

4. The plant irrigation apparatus of claim 1 wherein said cap is pivotally mounted to said mixing chamber portion.

5. The plant irrigation apparatus of claim 1 further comprising an annular nozzle connected to the water supply line.

6. The plant irrigation apparatus of claim 1 wherein the cap is transparent.

7. The plant irrigation apparatus of claim 1 wherein the stem comprises polyvinyl chloride.

8. The plant irrigation apparatus of claim 1 wherein the apparatus comprises the basket.

9. The plant irrigation apparatus of claim 1 further comprising fertilizer disposed within the mixing chamber portion and disposed on the basket or mixing chamber screen.

10. A plant irrigation apparatus comprising:
    a body having a mixing chamber portion at one end and a stem at another end, wherein said stem has apertures along a length of the stem;
    a removable cap atop said mixing chamber portion;
    a basket or a mixing chamber screen within said mixing chamber portion;
    a water supply line coupled to the mixing chamber portion and adapted to supply water within said mixing chamber portion; and
    a liquid dispenser having an inlet and an outlet, said inlet connected to said water supply line.

11. The plant irrigation apparatus of claim 10 wherein the stem comprises polyvinyl chloride.

12. The plant irrigation apparatus of claim 10 wherein the cap is transparent.

13. The plant irrigation apparatus of claim 10 wherein the apparatus comprises the basket.

14. The plant irrigation apparatus of claim 10 further comprising fertilizer disposed within the mixing chamber portion and disposed on the basket or mixing chamber screen.

15. The plant irrigation apparatus of claim 10 further comprising fertilizer disposed within the mixing chamber portion and disposed on the basket or mixing chamber screen.

16. The plant irrigation apparatus of claim 10 further comprising a nozzle connected to the liquid dispenser outlet.

17. A plant irrigation apparatus comprising:
    a body having a mixing chamber portion at one end and a pointed stem at another end, said mixing chamber portion having a slot and a plurality of holes proximate to a top portion of the mixing chamber portion, and wherein said stem has apertures along a length of the stem;
    a stem screen substantially covering said stem;
    a hinged cap offset from said mixing chamber portion sufficient to vent said mixing chamber portion;
    a basket or a mixing chamber screen in said mixing chamber portion;
    a water supply line; and
    a nozzle retained in said slot and connected to the water supply line, said nozzle coupled to the mixing chamber portion and being capable of providing water within the mixing chamber portion at an adjustable flow rate.

18. The plant irrigation apparatus of claim 17 wherein the stem comprises polyvinyl chloride.

19. The plant irrigation apparatus of claim 17 wherein the cap is transparent.

20. The plant irrigation apparatus of claim 17 wherein the apparatus comprises the basket.

* * * * *